United States Patent Office 3,209,815
Patented Oct. 5, 1965

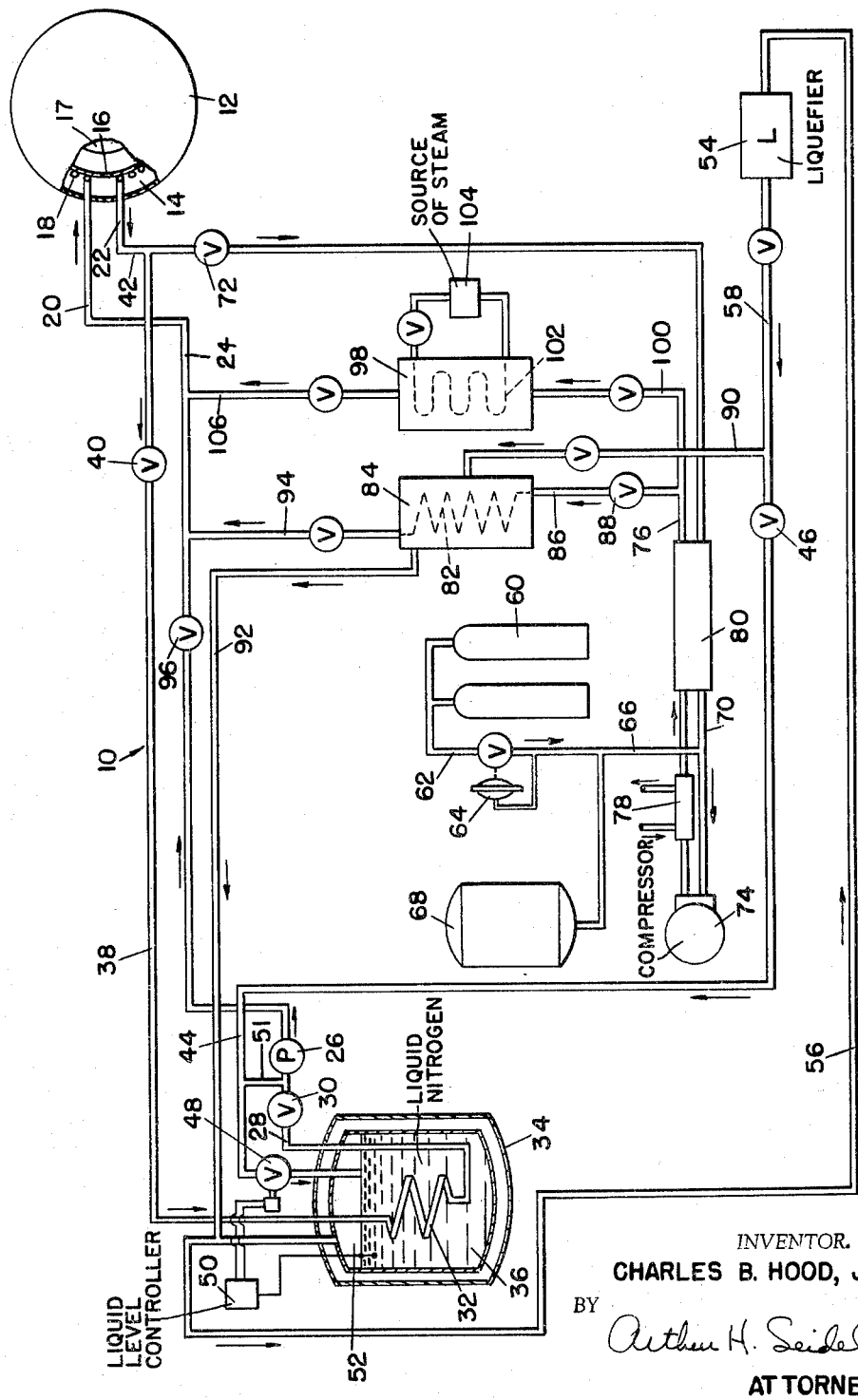

3,209,815
LIQUID AND GASEOUS THERMOCYCLE
APPARATUS
Charles B. Hood, Jr., Upper Arlington, Ohio, assignor to
CryoVac Incorporated, Columbus, Ohio, a corporation
of Ohio
Filed Nov. 7, 1961, Ser. No. 150,797
11 Claims. (Cl. 165—63)

This invention relates to a liquid and gaseous thermocycle apparatus and method. In particular, the present invention is directed to a novel liquid and gaseous system capable of varying the temperature in a chamber from the boiling point of water to the boiling point of a gas such as nitrogen.

In order to ascertain the heat radiation and absorption of a body in outer space, space simulation chambers have been designed. The present invention is directed to an apparatus and method which enables a space simulation chamber to be subjected to a temperature range varying from approximately 200° C. to approximately −193° C. In this manner, the space simulation chamber will act as a heat sink which radiates to a specimen in the chamber when subjected to a temperature of 200° C. and absorbs energy from the specimen in the chamber when at a temperature of −193° C.

A plurality of fluids may be utilized in the liquid and gaseous system of the present invention to vary the temperature of the chamber. Such fluids are preferably nitrogen, oxygen, and air. Other fluids may be used but are not preferred since they are either difficult to handle or are too expensive. The above mentioned temperature of −193° C. represents the effective boiling point of liquid nitrogen. Theoretically, the boiling point of liquid nitrogen is −196° C. However, radiation losses result in an effective temperature of −193° C. in use.

The space simulation chamber is capable of being subjected to three critical temperatures, namely (a) −193° C. which is the effective boiling point of liquid nitrogen, (b) −65° C. which is an intermediate temperature desirable for correlation with data being ascertained at this temperature in other related projects, and (c) 100° C. which is the boiling point of water at atmospheric pressure. The liquid and gaseous thermocycle apparatus of the present invention is designed so as to utilize a minimum amount of piping, so as to be simple and reliable while capable of subjecting the chamber to the above enumerated conditions. In addition, the apparatus of the present invention is designed so that the chamber may be quickly converted from being subjected to one of the above conditions to another of the above enumerated conditions. That is, the present invention is designed so that the temperature of the container may be quickly converted from −65° C. to −193° C.

In the liquid and gaseous thermocycle of the present invention, the coldest temperature is attained by recirculating a liquid gas such as liquid nitrogen. In order to attain the highest temperature and the intermediate temperature, the same gas, namely nitrogen, may be circulated in a gaseous state through either one of two heat exchangers. One of the last mentioned two heat exchangers will cool the gas below the ambient temperature while the other heat exchanger will heat the gas above ambient temperature. Also, a heat exchanger is provided so that the ambient temperature of the gas is either heated or cooled by the gas returning from the chamber.

It is an object of the present invention to provide a novel liquid and gaseous thermocycle apparatus.

It is another object of the present invention to provide a novel liquid and gaseous thermocycle system for subjecting a container to three varying temperatures so that the container may either absorb or radiate energy.

It is another object of the present invention to provide a novel thermocycle apparatus utilizing a single fluid in two states for heating or cooling a chamber.

It is still another object of the present invention to provide a novel liquid and gaseous thermocycle apparatus utilizing a minimum amount of components which are of rugged reliable construction so that an inlet conduit and an outlet conduit on a container may be placed in communication with a circulating fluid at three different temperatures.

Other objects will appear hereinafter.

For the purpose of illustrating the invention there is shown in the drawings, a form which is presently preferred; it being understood, however, that this invention is not limited to the precise arrangements and instrumentalities shown.

The figure illustrated in the drawing is a schematic view of the apparatus of the present invention.

Referring to the drawing in detail, wherein the present invention is schematically illustrated, there is shown a liquid and gaseous thermocycle apparatus designated generally as 10.

The apparatus 10 includes a space simulating chamber 12 having an outer wall spaced from inner wall 16 by means of a vacuum 14. In place of the vacuum 14, any suitable insulation may be substituted therefor. The inner wall 16 is provided with pipes 18 disposed therearound. The illustration of the chamber 12 is a transverse sectional view. For purposes of illustration, the pipes 18 are shown in transverse section so as to signify that the pipes run in a longitudinal direction with respect to the longitudinal axis of the chamber 12. However, the pipes 18 may be eliminated and a single pipe substituted therefor. When a single pipe is utilized, the same will be helically disposed with respect to the longitudinal axis of the chamber 12 so that an inlet end of the pipe is disposed adjacent the bottom of the chamber 12 and the outlet end thereof being disposed adjacent the top of the chamber 12.

The pipes 18 are provided with an inlet end in communication with an inlet conduit 20. The outlet end of the pipes 18 are in communication with an outlet conduit 22. The inlet conduit 20 is in communication with one end of a conduit 24. The other end of the conduit 24 is connected to the outlet side of a pump 26. The inlet side of the pump 26 is connected to one end of a conduit 28 having a valve 30 therein.

The end of the conduit 28 remote from the inlet side of the pump 26 is connected to one end of a condenser coil 32. The coil 32 is disposed within a subcooler 34 having a substantial amount of liquid nitrogen 36 disposed therein.

The upper end of the coil 32 is connected to a conduit 38 having a valve 40 therein. The end of the conduit 38 remote from the coil 32 is connected to a conduit 42. The conduit 42 is in communication with the outlet conduit 22.

The liquid nitrogen 36 is supplied to the subcooler 34 by means of a conduit 44. The conduit 44 is provided with a manual valve 46 and a liquid level responsive valve 48. It will be noted that the discharge end of the conduit 44 extends into the subcooler 34. A liquid level responsive controller 50 is connected to a solenoid operator for the valve 48 so as to maintain the level of the liquid nitrogen 36 substantially constant within the subcooler 34.

All pumps generate a small amount of heat. The heat generated by operation of pump 26 vaporizes a small amount of the liquefied nitrogen. This small amount of vaporized gas is lost to the atmosphere even though the pump seals are carefully designed. A conduit 51 extends from conduit 44 to conduit 28 between valve 30 and pump 26. Conduit 51 assists in enabling the system to operate at a substantially constant pressure since pressurized liquid nitrogen will automatically be introduced into the system when the system pressure drops below the pressure in conduit 51.

The level of the liquid nitrogen 36 within the subcooler 34 is maintained substantially constant so as to provide for an evaporation space 52 which is in communication with a liquefier 54 by means of conduit 56. The output side of the liquefier 54 is connected to the conduit 44 by means of a conduit 58. It will be obvious that a liquid nitrogen storage container can be provided in liquefier 54 so as to assist in supplying a substantially constant pressure in the system.

The structure described above is capable of automatically maintaining the space within the chamber 12 subjected to a temperature corresponding to the temperature of liquid nitrogen. Such temperature will be approximately −193° C. The structure to be set forth hereinafter is capable of being alternatively used so as to subject the space within the chamber 12 to higher temperatures, namely −65° C. or 100° C.

A supply 60 of a fluid in a gaseous state such as nitrogen is provided. Such supply 60 may comprise one or more cylinders of gaseous nitrogen at ambient temperature. The supply 60 is connected to a conduit 62 having a pressure regulator 64 therein. The pressure regulator 64 is of the type responsive to the outlet pressure thereof so that a valve of the pressure regulator 64 controls flow therethrough in response to the pressure on the outlet side on the pressure regulator. When a predetermined amount of pressure exists on the output side of the pressure regulator 64, the pressure regulator 64 closes thereby stopping the flow of gaseous nitrogen from the supply 60.

The output side of the pressure regulator 64 is connected to a conduit 66. A surge tank 68 is in communication with the conduit 66. The end of the conduit 66 remote from the pressure regulator 64 is in communication with a conduit 70 intermediate the ends of the conduit 70. The conduit 70 is provided with a valve 72 and one end of the conduit 70 is in communication with conduit 42. The other end of the conduit 70 is connected to the inlet side of a compressor 74.

A conduit 76 is connected to the outlet side of the compressor 74. A heat exchanger 78 is disposed within the conduit 76. The conduits 70 and 76 extend through a heat exchanger 80.

A coil 82 disposed within a cooler 84 is provided. One end of the coil 82 is in selective communication with the conduit 76 through a conduit 86 having a valve 88 therein. Liquid nitrogen may be circulated through the cooler 84 by means of valved conduit 90. One end of conduit 90 is connected to the interior of the cooler 84 and the other end of the conduit 90 is in communication with conduit 58. The interior of the cooler 84 is connected to the conduit 56 by means of an outlet conduit 92.

The other end of the coil 82 is in selective communication with conduit 24 by means of valved conduit 94 at a point intermediate inlet conduit 20 and valve 96 in conduit 24.

The gas in conduit 76 may alternatively be directed through a heater 98 by means of valved conduit 100. As such gas passes through the heater 98, the same may have its temperature elevated by contact with a steam coil 102 having its ends in communication with the inlet and outlet side of a source of steam 104. The outlet side of the heater 98 is in selective communication with conduit 24 by means of valved conduit 106 at a point intermediate the inlet conduit 20 and valve 96.

The apparatus and method of the present invention operates as follows:

A body designated generally as 17 will be supported within the chamber 12 in any convenient manner. Means, not shown, are provided for evacuating the interior of the chamber 12. The inner peripheral surface of the wall 16 is preferably jet black and the outer peripheral surface of the wall 16 is preferably a highly reflective surface. The jet black surface of the wall 16 may be attained by any convenient manner so as to prevent incident radiation from disturbing test results. The outer peripheral surface of the wall 16 may be made highly reflective by the provision of suitable coatings, polishing the surface, etc. Thus, the wall 16 is a heat sink.

In order to simulate a first condition wherein a specimen disposed within the chamber 12 will radiate heat to the heat sink, the heat sink will be caused to have a temperature of approximately −193° C. Such temperature will be attained by circulating liquid nitrogen through the pipes 18. Nitrogen in the form of a gas may be supplied to the conduit 38 by any convenient means not illustrated. The pump 26 is operated so as to circulate the gas or liquid from the conduit 38 through the coil 32. The evaporation of liquid nitrogen 36 within the subcooler 34 and the temperature of liquid nitrogen cools the gas so that it attains liquid form. Such liquid nitrogen is pumped by the pump 26 at a pressure of approximately 70 p.s.i. through conduit 24 to the inlet conduit 22.

The liquid nitrogen circulates through the pipes 18 and exhausts through the outlet conduit 22 through conduits 42 and 38 to the coil 32. Thus, a closed circuit of liquid nitrogen is provided to reduce the temperature of the heat sink to approximately −193° C. Thereafter, the amount of heat radiated from the specimen to the heat sink may be ascertained by conventional equipment. In this manner, the conditions of a body in space may be simulated so as to predict the approximate amount of heat radiation in outer space of a particular specimen.

The apparatus of the present invention may be rapidly varied so as to obtain data with the heat sink having a temperature of −65°. Such data is desirable since the same may be correlated with data attained in other projects at this temperature. To convert the apparatus of the present invention to obtain data with the heat sink having a temperature of −65° C., previously open valves 40, 46, and 96 are closed and a switch supplying electrical energy to the controller 50 is opened. Thus, valve 48 will also be closed. Previously closed valves 72 and 88 as well as the valves in conduits 90 and 94 and the pressure regulator 64 will be opened. It should be noted that the valves in conduits 100 and 106 are still closed.

Gas from the source of supply 60 will flow through the pressure regulator 64 and conduit 66 to the inlet side of the compressor 74. The compressor 74 will compress the gas and force the same through the heat exchanger 78 which removes the heat generated by the compressor 74. Thereafter, the gas passes through the heat exchanger 80, conduit 86, coil 82, and conduits 92, 24, and 20 to the pipes 18. From the pipes 18, the gas passes through the outlet conduit 22, through conduits 42 and 70, heat exchanger 80, back to the inlet side of the compressor 74.

As the gas passes through the coller 84, the liquid nitrogen passing therethrough from conduit 90 to 92 cools the same to a temperature of approximately −65° C.

As the gas passes through the cooler 84, the liquid nitro-outlet conduit 22, it cools the gas passing through the conduit 76 which has not yet entered the cooler 84. Thus, the system of the present invention takes advantage of the temperature of the gas as it returns from the chamber 12.

At a predetermined pressure of the gas in the conduit 66, the pressure regulator 64 will close thereby isolating the circulating system of gas from the source of supply 60. Any pressure variations in the closed gas system will be absorbed by the surge tank 68 which assists in maintaining the pressure of the gas constant.

When it is desired to provide the heat sink with a temperature of approximately 100° C. so that the heat sink radiates heat to the specimen within the chamber 12, the valves in conduits 58, 86, 90 and 94 are closed and valves in conduits 100 and 106 are opened. Also, the valve controlling the flow of steam to the coil 102 is open and the circulation of cooling medium through the heat exchanger 78 is stopped. Thus, the gas in conduit 76 passes into conduit 100, through the heater 98, through conduits 106 and 24 into conduit 20. From the inlet conduit 20, the gas passes through the pipes 18 to the outlet conduit 22.

From the outlet conduit 22, the gas passes through conduits 42 and 70 to the inlet side of the compressor 74. While the gas passes through conduit 70, it passes through the heat exchanger 80 thereby elevating the temperature of the gas passing through conduit 76. As the gas passes through the heater 98, the temperature of the gas is elevated by the steam passing through the steam coil 102.

Thus, it will be seen that we have provided a novel apparatus for selectively subjecting a chamber to any one of three different temperatures and rapidly converting from one temperature to another. The extremes of the temperatures to which the chamber may be subjected are sufficient so that a heat sink on the chamber may act either as a means for radiating heat to a specimen or absorbing heat from a specimen, thereby enabling data to be obtained under circumstances which approximate the circumstances of outer space. The apparatus and methods for measuring the temperature, thermal conductivity, etc. of the specimen may be conventional and per se form no part of the present invention.

The system of the present invention need not be confined in its use to space chamber heat sinks. The present invention may be utilized in any apparatus requiring circulated refrigerant or heating gas over wide temperature ranges. For example, the present invention may be used to circulate liquid hydrogen from a storage vessel at 20° K. for cryopumping applications. Likewise, the gaseous cycle could be used to circulate pressurized helium, cooled with liquid hydrogen in the cooler 84, for cryopumping.

A system as illustrated and described has been constructed with chamber 12 being cylindrical. The test specimen need not be disposed in the chamber 12 but may be thereabove in a separate chamber which communicates with chamber 12. The present invention may be utilized for research purposes wherein the effect of changes of temperature and low temperature behavior are being studied. In such event, the test specimen may be molecules of a solid, liquid or gas pumped into chamber 12.

It will be appreciated that many minor features involving commercially available equipment such as air vents, control panels, electrical wiring, etc., are not illustrated in the drawing since the same are not essential for an understanding of the present invention.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a container adapted to simulate outer space, a first conduit connected to an inlet port of said container, a second conduit connected to an outlet port of said container, a first means connected to said first and second conduits for selectively delivering a fluid to said first conduit at a first temperature and receiving the fluid from said second conduit at a second temperature which is warmer than said first temperature, said means also being capable of cooling said fluid from said second temperature to said first temperature before recycling the same to said first conduit, and a second means connected to said first and second conduits for selectively delivering a fluid to said first conduit at a third temperature which is warmer than said second temperature and receiving the fluid from said second conduit at a fourth temperature, said second means being capable of changing the temperature of the fluid from said fourth temperature to said third temperature before recycling the same to said first conduit.

2. An apparatus for selectively supplying a container with a heat transfer medium in the form of a liquid or a gas comprising first and second conduits, said conduits being connected to opposite ends of the coil, said coil being disposed within a subcooler partially filled with a liquefied gas, said second conduit having a liquid pump therein, means for delivering liquefied gas to said subcooler, means for maintaining the level of the liquefied gas in said subcooler at a predetermined point so that said subcooler remains partially filled with said liquefied gas, a source of gas, said source of gas being connected to the inlet side of a compressor, a third conduit connecting the output side of said compressor and said first conduit, and means in said third conduit for selectively varying the temperature of the gas in said third conduit.

3. Apparatus in accordance with claim 2 wherein said means for varying the temperature of the gas in said third conduit comprises a cooler operatively disposed with respect to said third conduit so as to reduce the temperature of the gas flowing through said third conduit.

4. Apparatus in accordance with claim 3 including conduits connected to said means for supplying a liquefied gas to said subcooler so that liquefied gas flows through said cooler.

5. Apparatus in accordance with claim 2 wherein said means in said third conduit comprises a heater, said heater being capable of elevating the temperature of said gas as it flows through said third conduit.

6. Apparatus comprising a container having an inlet and an outlet conduit, said inlet and outlet conduit being connected to a heat sink in said container, a subcooler partially filled with a liquefied gas, means for maintaining a predetermined level of liquefied gas within said subcooler, conduit means connected to said outlet and inlet conduit, said conduit means including conduits extending through said subcooler, a pump in said conduit means, whereby said pump may selectively circulate a liquefied gas through said conduit means and inlet and outlet conduits to said heat sink, and means selectively connectable with said inlet and outlet conduits for circulating a gas at a temperature higher than the temperature of said liquefied gas through said inlet and outlet conduits and heat sink.

7. Apparatus in accordance with claim 6 wherein said last mentioned means comprises a source of a heat transfer fluid in a gaseous state, a pumping means connected to said source, conduits connecting the inlet and outlet side of said pumping means to the inlet and outlet conduits, and heat exchange means in said last mentioned conduits for changing the temperature of the gas before it enters the inlet conduit.

8. Apparatus in accordance with claim 7 wherein said heat exchange means decreases the temperature of said gas before it enters the inlet conduit.

9. Apparatus in accordance with claim 7 wherein the heat exchanger means increases the temperature of said gas before it enters the inlet conduit.

10. Apparatus in accordance with claim 7 wherein said heat exchange means comprises a cooler and a heater disposed in said last mentioned conduit in parallel with one another, and valves in said last mentioned conduit so that the gas may be selectively directed through one of said cooler and heater prior to entering said inlet conduit.

11. Apparatus comprising a container having an inlet and an outlet, a first conduit extending from the outlet conduit to the inlet side of a pump, means disposed around said first conduit for liquefying gases disposed within said first conduit, a second conduit extending from the outlet side of said pump to said inlet conduit, a third conduit connected to said second conduit, means for cooling a gas disposed around a portion of said third conduit, a fourth conduit connected to said second conduit, means disposed around a portion of said fourth conduit for heating a gas disposed in said fourth conduit, means for selectively placing said third and fourth conduits in communication with a source of gas, a fifth conduit connected to said first conduit and said third and fourth conduits, and a pressure regulator between said source of gas and said fifth conduit.

References Cited by the Examiner

UNITED STATES PATENTS

| | | | |
|---|---|---|---|
| 1,898,758 | 2/33 | Bottoms | 62—64 X |
| 2,448,826 | 9/48 | Reaser. | |
| 2,475,138 | 7/49 | Hood et al. | 73—15 |
| 2,547,879 | 4/51 | McGrath | 236—1 |
| 2,618,939 | 11/52 | Morrison | 62—64 |
| 2,888,204 | 5/59 | Williams. | |
| 3,010,220 | 11/61 | Scheuller | 35—12 |
| 3,023,588 | 3/62 | Morrison | 62—64 |
| 3,064,364 | 11/62 | Scheuller | 35—12 |
| 3,068,659 | 12/62 | Marshall | 62—52 |

OTHER REFERENCES

Publication: Heating and Ventilating's Engineering Databook, first ed., N.Y. Industrial Press, 1948, Section 6, p. 82.

CHARLES SUKALO, *Primary Examiner.*

ALDEN D. STEWART, *Examiner.*